United States Patent
Le et al.

(10) Patent No.: US 10,609,643 B1
(45) Date of Patent: Mar. 31, 2020

(54) NFC REPEATER SYSTEM

(71) Applicant: NXP B.V., Eindhoven (NL)

(72) Inventors: Nguyen Trieu Luan Le, Cormelles le Royal (FR); Xavier Jerome Kerdreux, Bieville Beuville (FR); Jean Barbotin, Normandie (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/530,327

(22) Filed: Aug. 2, 2019

(30) Foreign Application Priority Data

May 17, 2019 (EP) .................................... 19305631

(51) Int. Cl.
    *H04W 52/02* (2009.01)
    *H04B 5/02* (2006.01)
    *H04B 7/15* (2006.01)

(52) U.S. Cl.
    CPC .......... *H04W 52/0225* (2013.01); *H04B 5/02* (2013.01); *H04B 7/15* (2013.01)

(58) Field of Classification Search
    CPC ............... H04W 56/001; H04W 56/00; H04W 52/0225; H04W 56/002; H04W 88/04; H04W 52/0274
    See application file for complete search history.

(56) References Cited

U.S. PATENT DOCUMENTS

| | | | |
|---|---|---|---|
| 7,539,520 B2 | 5/2009 | Twitchell, Jr. | |
| 9,295,099 B2 | 3/2016 | Twitchell, Jr. | |
| 2004/0135691 A1 | 7/2004 | Duron | |
| 2009/0121865 A1* | 5/2009 | Hamel | A61B 1/00006 340/539.17 |
| 2011/0261907 A1 | 10/2011 | Lee | |
| 2015/0012761 A1 | 1/2015 | Li | |
| 2015/0044967 A1 | 2/2015 | Hillan et al. | |
| 2015/0071150 A1 | 3/2015 | Bradley | |
| 2018/0343036 A1 | 11/2018 | Kim | |

FOREIGN PATENT DOCUMENTS

WO      2018206124 A1      11/2018

* cited by examiner

*Primary Examiner* — Keith Ferguson

(57) ABSTRACT

A wireless repeater system includes an antenna configured to receive a magnetic wake-up signal, a near field communication (NFC) receiver configured to receive a wake-up pattern and compare the received wake-up pattern with a stored wake-up pattern, and an NFC transmitter configured to transmit an output magnetic signal using the stored wake-up pattern to an external device, wherein the transmission of the output magnetic signal is synchronized with the received wake-up pattern to form a superimposed magnetic signal.

20 Claims, 9 Drawing Sheets

NFC REPEATER SYSTEM

This application is based upon and claims the benefit of priority from prior European Patent Application No. 19305631.4, filed May 17, 2019, which is hereby incorporated by reference for all purposes as if fully set forth herein.

TECHNICAL FIELD

Example embodiments disclosed herein relate generally to near field communication (NFC) wake-up and including remotely waking up a large group of powered-off NFC equipped devices for software updates or pre-personalization. Each device may act as a relay to reach other devices that are out of range from a wake-up station.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

Example embodiments include a wireless repeater system, including an antenna configured to receive a magnetic wake-up signal, a near field communication (NFC) receiver configured to receive a wake-up pattern and compare the received wake-up pattern with a stored wake-up pattern, and an NFC transmitter configured to transmit an output magnetic signal using the stored wake-up pattern to an external device, wherein the transmission of the output magnetic signal is synchronized with the received wake-up pattern to form a superimposed magnetic signal.

The output magnetic signal may be synchronized with the received magnetic signal and another output magnetic signal transmitted by an adjacent device.

The NFC receiver may be in a power-off state before receiving the wake-up signal.

The output magnetic signal may have a higher amplitude than a threshold value.

The output magnetic signal may be transmitted via the antenna.

The wireless repeater system may include an envelope detector that is configured to compare the received magnetic wake-up signal with a threshold voltage to determine HIGH periods and LOW periods of the received wake-up signal and output a signal type indicator wake up pattern reflective of the HIGH and LOW periods.

The NFC receiver may include a counter configured to measure a duration of periods of the wake-up pattern, a data storage module configured to receive a predetermined number of data sets of the wake-up pattern, and a pattern detector configured to compare the received wake-up pattern to the stored wake-up pattern.

Each data set may include a signal type and a duration of a detected signal period.

Example embodiments may also include a packaged wireless device including an antenna configured to receive a magnetic wake-up signal, a near field communication (NFC) receiver configured to receive a wake-up pattern and compare the received wake-up pattern with a stored wake-up pattern, and an NFC transmitter configured to transmit an output magnetic signal using the stored wake-up pattern to an external packaged device, wherein the transmission of the output magnetic signal is synchronized with the received wake-up pattern to form a superimposed magnetic signal.

The wireless repeater system may include an envelope detector that is configured to compare the received magnetic wake-up signal with a threshold voltage to determine HIGH periods and LOW periods of the received wake-up signal and output a signal type indicator wake up pattern reflective of the HIGH and LOW periods.

The NFC receiver may include a counter configured to measure a duration of periods of the wake-up pattern, a data storage module configured to receive a predetermined number of data sets of the wake-up pattern, and a pattern detector configured to compare the received wake-up pattern to the stored wake-up pattern.

Each data set may include a signal type and a duration of a detected signal period. Example embodiments may also include a method, including receiving, at one packaged device a magnetic signal, waking up the one packaged device using the magnetic signal, detecting a received wake-up pattern in the magnetic signal, comparing the received wake-up pattern to a stored wake-up pattern, and transmitting an output magnetic signal using the stored wake-up pattern to an external packaged device, wherein the transmission of the output magnetic signal is synchronized with the received wake-up pattern to form a superimposed magnetic signal.

The method may include the output magnetic signal being synchronized with the received magnetic signal and another output magnetic signal transmitted by an adjacent device.

The method may include the output magnetic signal having a higher amplitude than a threshold value.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
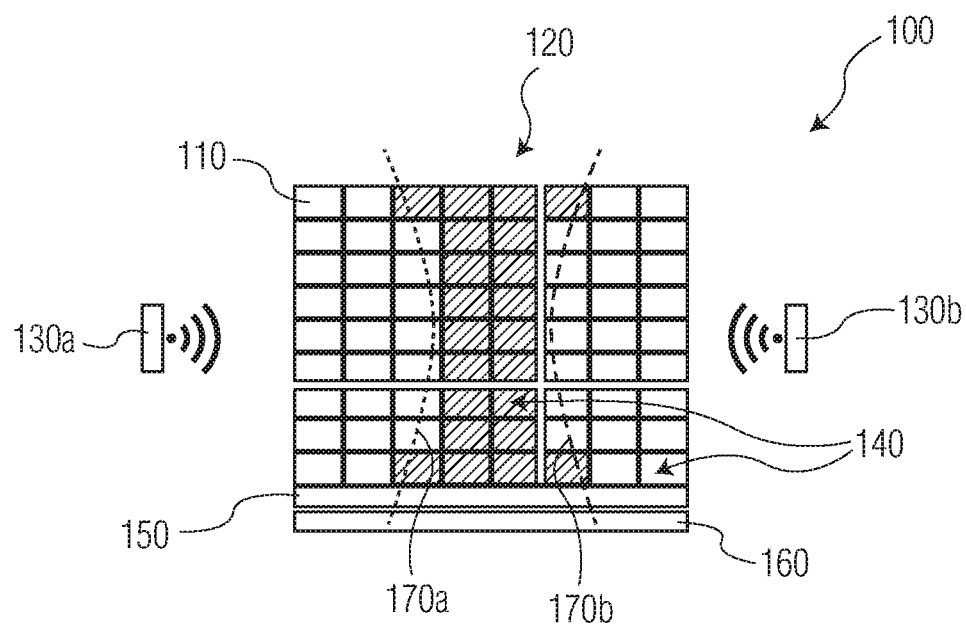
FIG. 1 illustrates partial wake-up coverage with a full pallet of a pile of packaged devices.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Pre-personalization of devices such as smartphones, wearable devices, internet of things (IoT) devices, mobile devices, or the like may be part of manufacturing, packaging, and delivery processes before the devices reach an end user for personalization. During a manufacturing process, devices of a same or similar model/type may be assembled and equipped with a same or similar set of components and loaded with a same version of an operating system (OS) and a predefined set of software (SW). This may be done in an automated way on a dedicated assembly chain. After final testing, various devices are packaged, packed, and shipped to warehouses. Once arriving to the warehouses, there is often a need to further program or pre-personalize these packaged devices already packed into a box with accessories. The further programming or pre-personalization may include local language configuration and other settings such as installing a network operator display logo. To minimize the cost of these operations, updates may be done using a wireless network or links to avoid unboxing devices which is not preferable when considering batches of a large number of devices in their original boxes. A batch may include a full pallet with boxes aligned close to each other horizontally as well as vertically.

In order to provide additional programming to packaged devices, an initial procedure includes remotely waking up one or more devices from a power-off mode. Wake on Wireless LAN (WoWLAN) is a known remote wake-up technique. In such a technique, a WLAN transceiver module of a desired device may wake-up from a standby mode at a regular interval. The wake-up may take place in order to check for a relevant wake-up signal pattern sent by a station before waking up the entire packaged device to perform specific operations. In traditional systems, WLAN protocol requires the packaged devices to remain within the registered WLAN network otherwise communication cannot be established. This is not often possible because the packaged devices are packed at a manufacturing site then shipped to warehouses at various locations.

Contactless technology such as NFC may be used to address the remote wake-up issue. NFC technology allows device-to-device communication without the constraint of observing specific network protocol. Also, a packaged device can be woken up from a power-off mode when receiving power from a reader. This interaction prevents the need for a packaged device to wake-up at a regular interval to check for a received signal thus saving a significant amount of battery energy. A wireless charging application according to example embodiments described herein may use such technology. When a packaged device to be programmed is placed near a wireless reader, power is provided from the wireless reader to the packaged device via magnetic waves. With the received energy, a remote contactless/NFC receiver in the device wakes up and establishes communication with the wireless reader.

FIG. 1 illustrates partial wake-up coverage with a full pallet 150 of a pile 100 of packaged devices 110 and 120. The pallet may sit on a rail 160. One drawback of traditional systems is transmitted power from wireless readers 130a and 130b decreases rapidly with distance and reduces further when obstacles are placed between the wireless readers 130a and 130b and packaged devices. This and other scenarios provide a challenge for waking up a full pallet 150 of devices packed in boxes that are tightly placed next to each other. Curved line 170a represents a first wireless reader 130a acceptable field strength limit and curved line 170b represents a second wireless reader 130b acceptable field strength limit. Due to the distance of the inner packaged devices 120 from the wireless readers 130a and 130b and the screening effect of adjacent packaged devices, inner packaged devices 120 that are farther away from the wireless readers 130a and 130b do not receive enough power to be woken up. Packaged devices 110 closer to the wireless readers 130a and 130b may be able to decipher a wake-up pattern, but the inner packaged devices 120 are out of range. In order to reach the inner packaged devices 120 at a center of the pile 100, a higher-powered magnetic field from one or both of the wireless readers 130a and 130b may be used, but the higher power signals would damage packaged devices 110 on outer sides of the pile 100.

Figure 2:
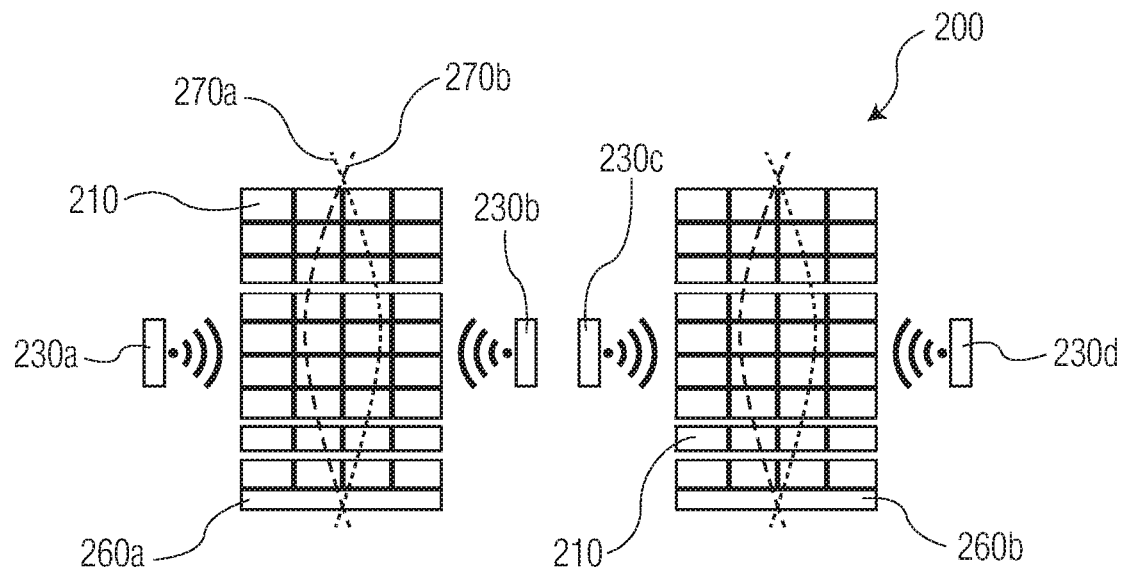
FIG. 2 illustrates full wake-up coverage with sub-piles and multiple readers and rails.

FIG. 2 illustrates full wake-up coverage with sub-piles 200 and multiple readers 230a, 230b, 230c, 230d, and rails 260a and 260b. One attempt to reach all available packaged devices 210 is to subdivide a pallet into smaller stacks such that each packaged device 210 would be within an acceptable field strength 270a and 270b of adjacent readers such as wireless readers 230a and 230b. This option has drawbacks including extra effort to split the pallet into small piles. Furthermore, this splitting of the pallet increases the number of wireless readers 230a-230d and dedicated physical structures such as parallel rails 260a and 260b as well as time needed to perform pre-personalization operation of all the packaged devices. There is therefore a need to improve the remote wake-up method to handle a full pallet of packaged devices at once.

Figure 3:
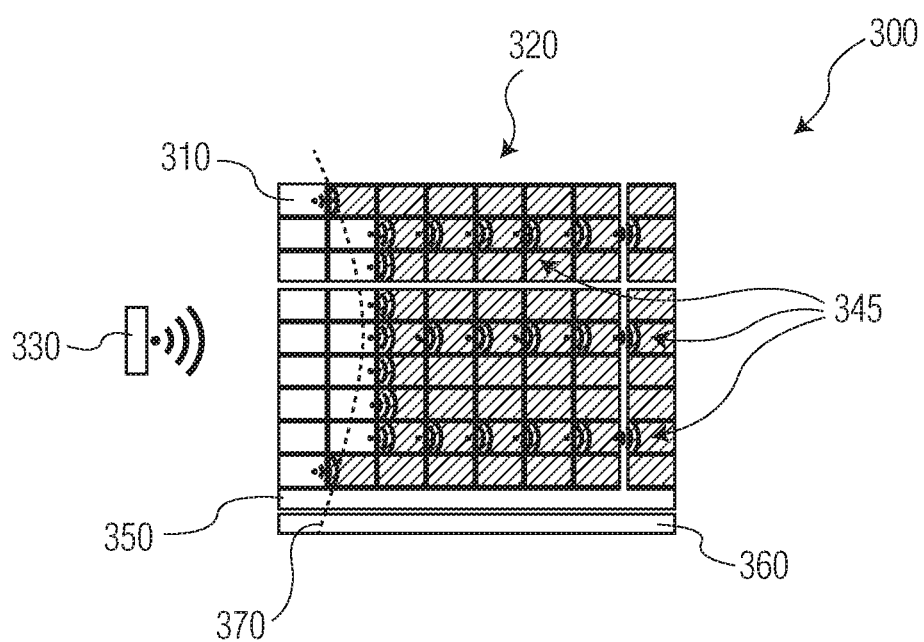
FIG. 3 illustrates an NFC repeater system for a wake-up relay procedure in accordance with example embodiments described herein.

FIG. 3 illustrates an NFC repeater system 300 for a wake-up relay procedure in accordance with example embodiments described herein. Example embodiments include apparatuses and methods configured to increase a remote wake-up coverage of an entire pallet 350 of packaged devices 310 and 320 while keeping a magnetic field strength emitted by a wireless reader 330 to a safe level for all packaged devices 310 and 320. Using the wireless reader 330, the field strength of a signal emitted therefrom may only extend to the dotted line 370. From this point on, outer packaged devices 310 and inner packaged devices 320 may be equipped with an NFC repeater system in order to act as relays configured to relay a wake-up pattern (also referred to as a wake-up signal pattern) to further inner package devices 320.

An outer packaged device 310 that communicates with the wireless reader 330 may perform as a wake-up relay 345 to wake-up inner packaged devices 320. This relay of a wake-up signal from outer package devices 310 to inner packaged devices 320, and subsequently from inner packaged devices 320 to each other via wake-up relays 345 allows communication of the wake-up signal between the external wireless reader 330 and each of the packaged devices of the full pallet 350. Each packaged device that is woken up will begin to transmit its own magnetic field and duplicate the data transmitted by the NFC wireless reader 330 to wake-up neighboring devices. Example embodiments also include packaged devices and methods to propagate data in synchronization with the external wireless reader 330 such that data can be properly received by all the packaged devices. One of many benefits is a reduced transmit power of the external NFC wireless reader station 330 even as compared to the sub pile configuration illustrated in FIG. 2.

Figure 4:
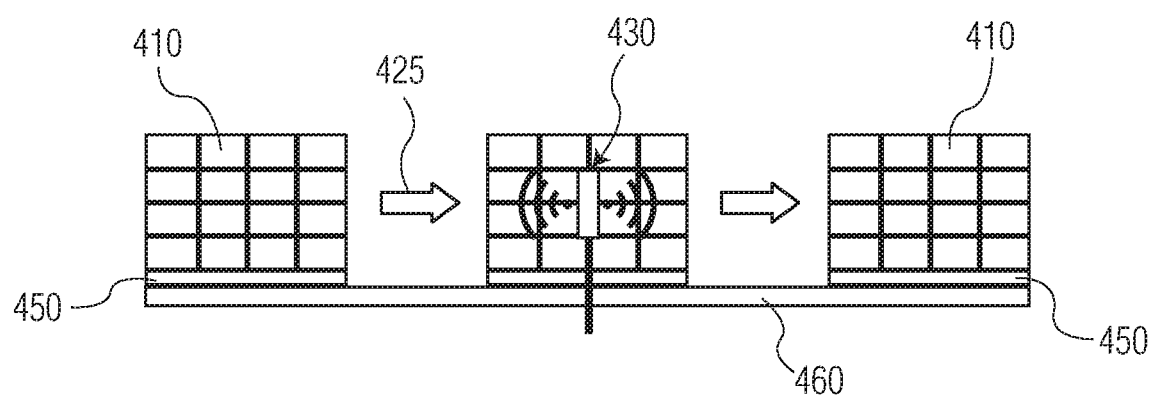
FIG. 4 illustrates pallets passing by an NFC wireless reader in accordance with example embodiments described herein.

FIG. 4 illustrates pallets 450 passing by an NFC wireless reader 430 in accordance with example embodiments described herein. As previously discussed, after assembly and final testing at a manufacturing site, packaged devices 410 may be packed into a box or other container and shipped to warehouses. The boxes may be assembled per batch on a pallet 450 or other designator for transportation. At the warehouse, to perform additional programming, the pallets 450 are conveyed towards the NFC wireless reader 430. The NFC wireless reader 430 may constantly be on and transmit a wake-up signal, or the NFC wireless reader 430 may be turned on when a new shipment arrives. At the approach of a pallet 450, the NFC wireless reader 430 transmits radio frequency (RF) magnetic waves with a predefined signal pattern, known by the packaged devices 410 on the pallet 450 to wake them up and have them perform specific operations (e.g. pre-personalization).

Figure 5:
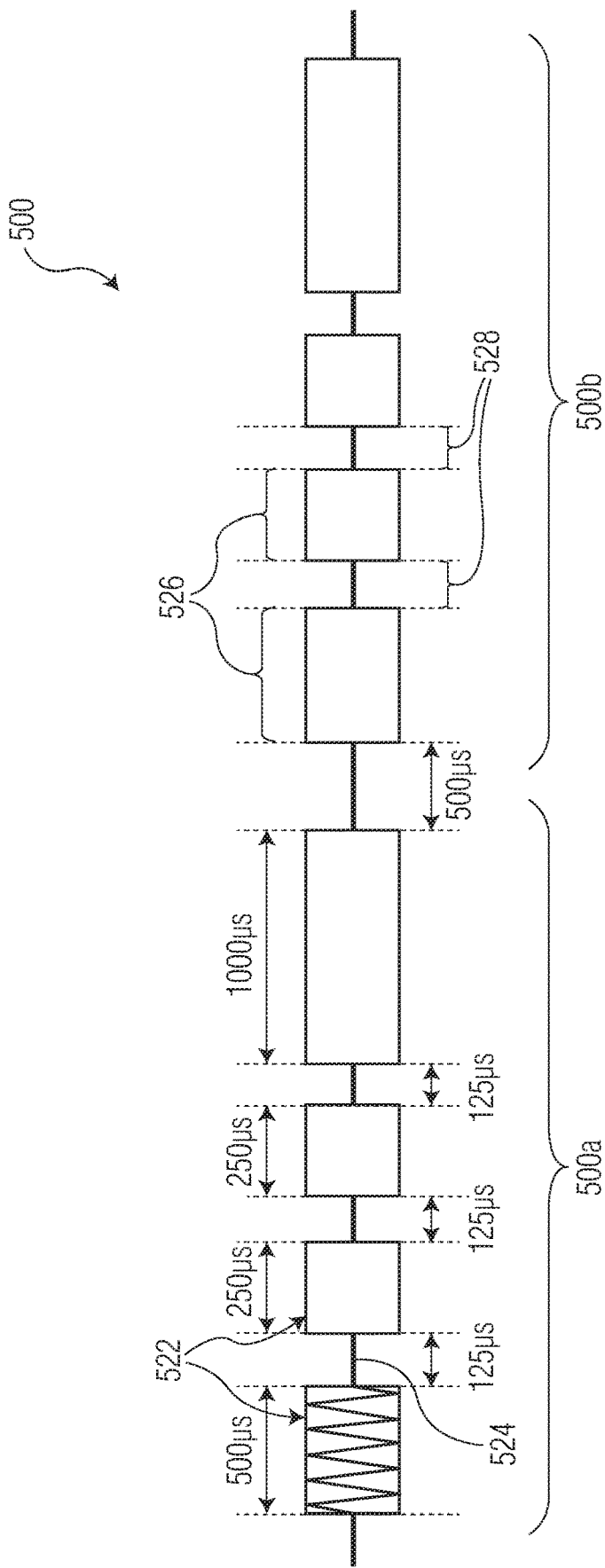
FIG. 5 illustrates two successive occurrences of an example wake-up signal pattern in accordance with example embodiments described herein.

FIG. 5 illustrates two successive occurrences 500a and 500b of an example wake-up signal pattern 500 in accordance with example embodiments described herein. The wake-up signal pattern 500 is transmitted by an NFC wireless reader and may be 100% AM (amplitude modulation) alternating RF magnetic waves (e.g. 13.56 MHz). The wake-up signal pattern 500 may be part of a received magnetic wake-up signal that is transmitted from the NFC wireless reader. Example embodiments may alternatively employ other modulation types (e.g. AM with different modulation index, FSK, PSK . . . ). The wake-up signal pattern 500 may be a predefined signal stream, alternating periods of full amplitude signal waves 522 and zero amplitude signal waves 524, respectively called HIGH signal periods 526 and LOW signal periods 528.

Figure 6:
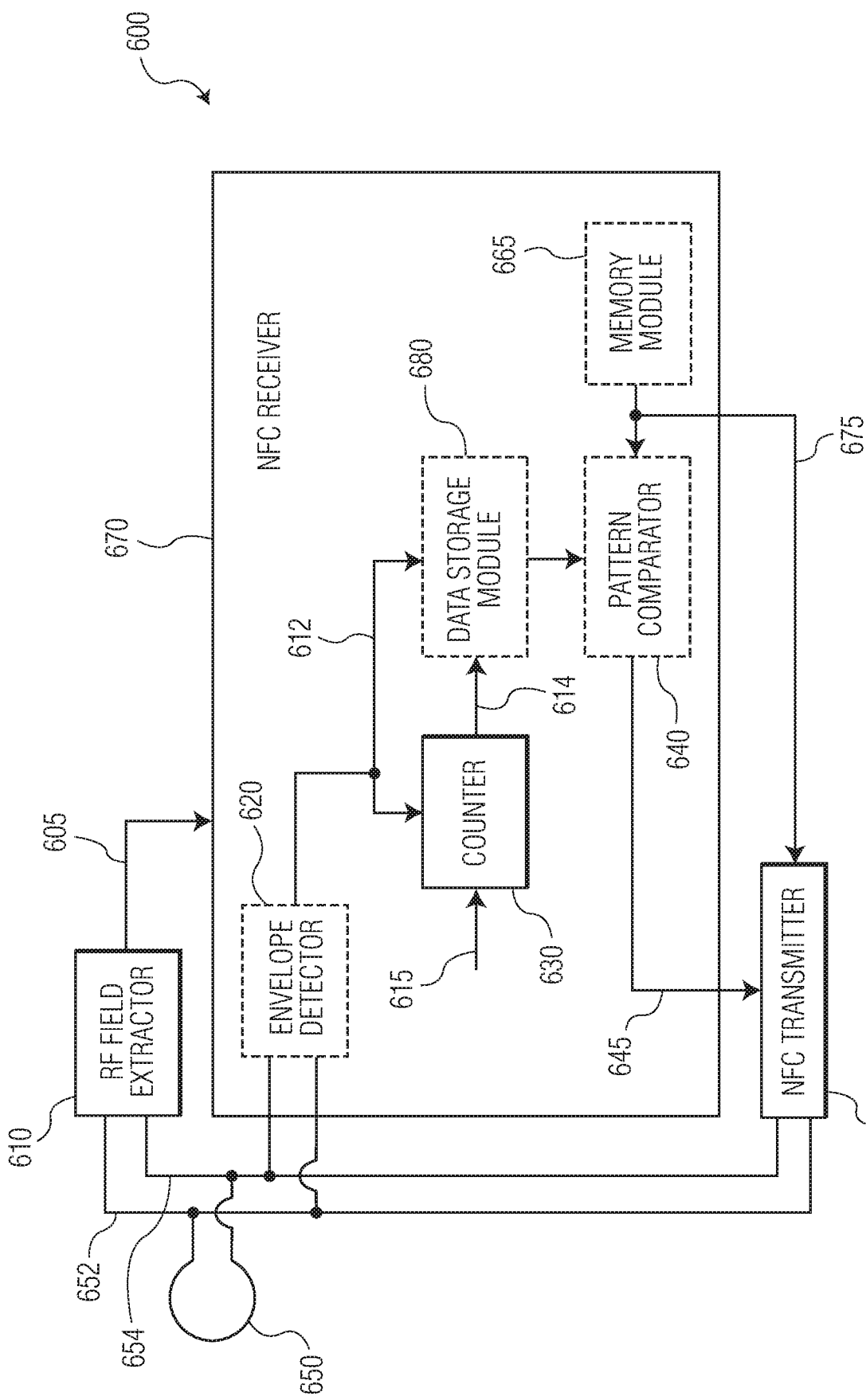
FIG. 6 illustrates an NFC repeater system in accordance with example embodiments described herein.

FIG. 6 illustrates an NFC repeater system 600 in accordance with example embodiments described herein. Each of the packaged devices may include the NFC repeater system 600 described herein. The NFC repeater system 600 may include an antenna 650 connected to wires 652 and 654, an RF field extractor 610, an NFC receiver 670, and an NFC transmitter 660. The antenna 650 may receive the magnetic wake-up signal or magnetic waves from the NFC wireless reader (illustrated in FIG. 4). When one or a plurality of packaged devices gets close to an NFC wireless reader and receives a sufficiently strong magnetic field, the RF field extractor 610 may wake-up the NFC receiver 670 via a wake-up signal pattern 605. The RF field extractor 610 may be self-powered allowing the packaged device to virtually consume no power while in deep sleep mode.

The NFC receiver 670 may include an envelope detector 620, a counter 630, a data storage module 680, a memory module 665, and a pattern comparator 640. The envelope detector 620 may extract the NFC wake-up pattern through wires 652 and 654 from the received magnetic wake-up signal. The envelope detector 620 may include one or a plurality of comparator components configured to compare the received signal with a threshold voltage to determine HIGH periods (e.g., a portion of the received signal that is greater than the threshold voltage) and LOW periods (e.g., a portion of the received signal that is less than the threshold voltage). The envelope detector 620 outputs a signal type indicator to the counter 630 and to the data storage module 680. The signal type indicator may include the wake up pattern and be termed a signal type indicator wake up pattern 612.

The envelope detector 620 may detect and measure a duration of the successive HIGH signal periods 526 and LOW signal periods 528 (illustrated in FIG. 5). The signal type indicator wake up pattern 612 may be a one-bit signal wherein a logic HIGH indicates a HIGH period when the envelope value is above a threshold value. Due to their similarity, the RF field extractor 610 (illustrated in FIG. 7A) and envelope detector 620 can be combined into a single circuit block as illustrated in FIG. 7B, sharing common circuit elements. The duration of a HIGH or LOW signal period can be measured by the counter 630 that receives a clock signal 615, coupled to the data storage module 680. If a same signal period is detected (HIGH or LOW), the counter 630 is increased by one unit at each period of a reference clock. At the detection of a change in the signal type indicator wake-up pattern 612 (HIGH to LOW or LOW to HIGH), indicating the end of a signal period, the data storage module 680 records the type of the signal period and value of the counter 630 as its duration, and the counter 630 is reset to start measuring the duration of the next signal period. In one example embodiment, the data storage module 680 may include eight data sets, suitable for the detection of the signal type indicator wake-up pattern 612 output from the envelope detector 620 including eight signal periods. A data set may be a pattern unit or unit of signal structure. Each data set may include the signal type and duration of a detected signal period. A new set of data (signal type indicator wake-up pattern 612 and counter output 614) may be shifted into the data storage module 680 when a complete signal period is detected (change in signal type detected). Thus the envelope detector 620 may be configured to compare the received magnetic wake-up signal with a threshold voltage to determine HIGH periods and LOW periods of the received magnetic wake-up signal and output a HIGH or LOW signal type indicator reflective of the HIGH and LOW periods, wherein a set of signal type indicators corresponds to the extracted wake-up signal pattern.

The pattern comparator 640 is coupled to the data storage module 680, memory module 665 and the NFC transmitter 660. The memory module 665 may include eight data sets (signal type and duration) corresponding to the eight signal periods of the signal type indicator wake-up pattern 612. The memory module 665 may include a plurality of different reference wake-up signal patterns 675. For example, different reference wake-up signal patterns may be stored in the memory module 665. The extracted wake-up pattern may be compared to different stored wake-up patterns until a match is made. Detection algorithms may function in different manners to determine whether the extracted wake-up pattern matches a stored wake-up pattern, based on comparing the data sets of the extracted wake-up pattern to the data sets of each stored wake-up pattern until a match is found. Each of the various wake-up patterns could instruct the packaged devices differently. For example, each stored wake-up pattern may be associated with a different integer number of iterations (e.g., a number of times that is great enough to ensure the original wake-up signal is propagated across a pallet of packaged devices). Once a given packaged device determines that the extracted wake-up pattern matches a particular stored wake-up pattern associated with a specific number, the packaged device is configured to output the particular stored wake-up pattern for the specific number of times. In other embodiments, each stored wake-up pattern may be associated with a different designated duration, where the packaged device is configured to output a particular stored wake-up pattern for the designated duration (e.g., a period of time that is long enough to ensure the original wake-up signal is propagated across a pallet of packaged devices). In some embodiments, each stored wake-up pattern may be associated with a different set of commands, such as commands used to initialize the packaged device for pre-personalization. In some embodiments, each stored wake-up pattern may be associated with a different set of settings for per-personalization, where the wake-up pattern implements both a wake-up scheme and a per-personalization scheme concurrently on the packaged devices. In some embodiments, one or more pre-personalization commands may be received by the packaged device after the device has awoken (e.g., after receipt of the wake-up pattern). In such embodiments, the one or more pre-personalization commands may also be transmitted in a repeated manner similar to the relay procedure described herein in order to reach all packaged devices (e.g., on a pallet).

The pattern comparator 640 compares the predetermined number of data sets of the extracted wake-up signal pattern recorded in the data storage module 680 to a predetermined number of data sets of each reference wake-up signal pattern 675 in the memory module 665 until a match is found. The pattern comparator 640 outputs a match/sync indicator signal 645 to the NFC transmitter 660 that indicates whether a match is found. If the type and duration of each data set in the data storage module 680 matches with the type and duration of the corresponding data set of the reference wake-up signal pattern 675 in the memory module 665, then a match/sync indicator pulse is set at logic HIGH (time point t3 of FIGS. 8 and 9). The match/sync indicator signal 645 may also be used as a sync indicator to activate the transmission of the matching reference wake-up signal by one device to another. The match/sync indicator pulse 645 may indicate an end of a pattern occurrence which is also the start of a next pattern occurrence. Thus, when pattern comparator 640 finds a match, NFC transmitter 660 receives a logic HIGH match/sync indicator signal 645 while also receiving the matching reference wake-up signal pattern 675 from memory module 665. In response to the match/sync indicator 645, NFC transmitter 660 is triggered to generate an output magnetic signal based on the reference wake-up signal pattern 675, which may repeat the pattern some number of times. In some embodiments, the original wake-up signal received by a given packaged device may include a repeating wake-up signal pattern transmitted by reader 330 or by another neighboring device. The given packaged device may use an initial portion of the original wake-up signal to detect the wake-up pattern, and use the match/sync indicator signal 645 to time the transmission of the output magnetic signal to substantially superimpose the output magnetic signal with a subsequent portion of the original wake-up signal such that the (matching) wake-up patterns implemented in both signals are aligned, and a combined signal power of the resulting superimposed signal is great enough to wake up neighboring packaged devices. Further, using the match/sync indicator signal 645 to synchronize concurrent transmission of the output magnetic signal by multiple packaged devices (e.g., "downstream" from the reader 330) also ensures that the output magnetic signals are transmitted at substantially the same time to produce a superimposed signal with a combined signal power great enough to wake up neighboring packaged devices. Thus, the relay procedure described herein ensure that the original wake-up signal transmitted by reader 330 propagates across the pallet of packaged devices.

Example embodiments provide a wake-up NFC receiver 670 and a packaged device that are in a powered-off state until receiving energy from an external magnetic signal. The NFC receiver 670 and the packaged device consumes no power while waiting for the reception of a wake-up message.

Figure 7A:
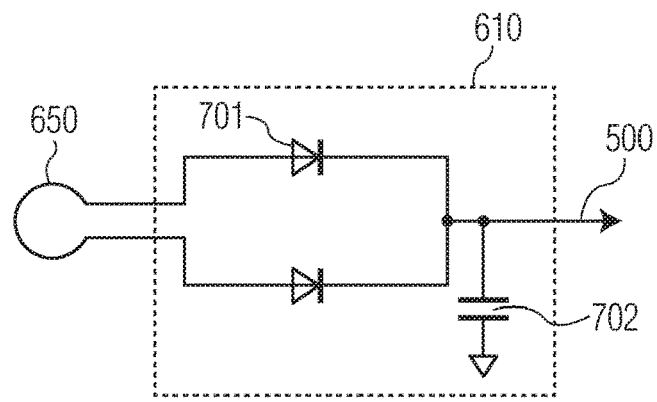
FIG. 7A illustrates a schematic of the RF field extractor in accordance with FIG. 6.
Figure 7B:
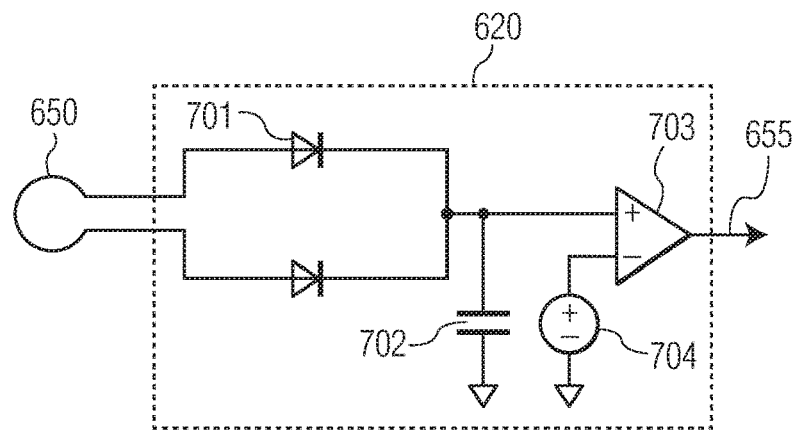
FIG. 7B illustrates the envelope detector in accordance with FIG. 6.

FIG. 7A illustrates a schematic of the RF field extractor 610 in accordance with FIG. 6. The RF field extractor 610 may include a diode rectifier 701 and a filter capacitor 702 configured to output the signal type indicator wake-up pattern 612.

FIG. 7B illustrates the envelope detector 620 in accordance with FIG. 6. The envelope detector 620 may include the diode rectifier circuitry of the RF field extractor 610 followed by a comparator 703. A difference between the signal type indicator wake-up pattern 612 and a threshold voltage 704 may be input to the comparator 703 to determine a value of the signal type indicator wake up pattern 612.

Figure 7C:
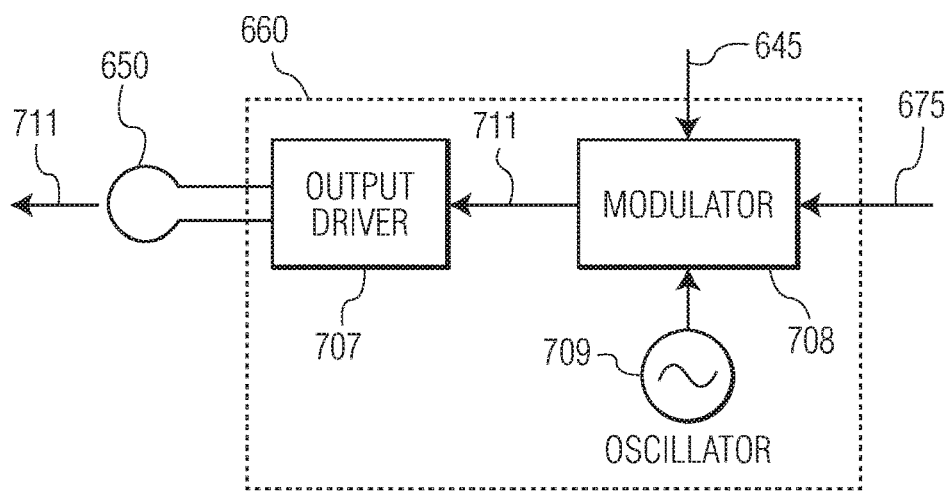
FIG. 7C illustrates the NFC transmitter in accordance with FIG. 6.

FIG. 7C illustrates the NFC transmitter 660 in accordance with FIG. 6. The NFC transmitter 660 may include a modulator 708, an oscillator 709 and an antenna output driver 707. The NFC transmitter 660, by way of the modulator 708, receives the match/sync indicator signal 645 from the pattern comparator 640 that is coupled to the memory module 665. In response to a pulse of the match/sync indicator signal 645, the NFC transmitter 660 may be activated and the modulator 708 starts modulating an RF carrier from the oscillator 709 and generates the HIGH signal periods and LOW signal periods corresponding to the pre-loaded reference wake-up signal pattern 675. The antenna output driver 707 drives the antenna 650 with the signal received from the modulator 708. Due to the match/sync indicator signal 645, the modulated signal 711 is generated in sync with the start of the next original wake-up signal pattern generated by an external reader station (not illustrated). By doing so, example embodiments ensure a synchronized overlap between the signal type indicator wake-up pattern 612 generated by a wireless reader and a wake-up pattern generated by the packaged device acting as a relay. The NFC transmitter 660 is configured to time the transmission of the predefined reference wake-up signal pattern 675 with the received wake-up pattern and transmit the signal to one or more packaged devices so that the transmitted signal is superimposed on the received wake-up pattern. When a valid wake-up pattern has been detected, a receive function of a packaged device may be turned off as the transmit function of the packaged device superimposes the transmitted signal on the predefined reference wake-up signal pattern 675. A plurality of reference wake-up signal pattern occurrences may be generated by the NFC transmitter 660 successively to ensure that nearby packaged devices receive the wake-up signal. After transmission of the wake-up signal by a packaged device, a given packaged device may remain in a receiver off state for a predetermined amount of time to avoid echo signals or noise signals that may re-trigger the receive and transmit (or relay) operation.

Once a packaged device receives a valid wake up pattern, the packaged device may transmit in a plurality of directions to reach other devices. One of these directions may be sent to the NFC transmitter 660. The NFC transmitter 660 may be configured to detect the return signal such that the NFC transmitter 660 stops transmitting for a predetermined amount of time, is triggered by a sensor, or is reactivated by a user.

The match/sync indicator signal 645 may be used by the NFC transmitter 660 of the packaged device to transmit the identical wake-up signal pattern of the NFC wireless reader (not illustrated) and at substantially the same time. In example embodiments, as soon as the match/sync indicator signal 645 goes HIGH, the NFC transmitter 660 generates and transmits the predefined reference wake-up signal pattern 675 that is preloaded into the memory module 665. This allows the modulated signal pattern 711 generated by the packaged device to superimpose over the wake-up signal pattern 500 transmitted by the NFC reader station (and its neighboring devices) with an accurate timing resulting in the same wake-up signal pattern but with a higher amplitude as compared to the one generated by the NFC reader station alone. The modulated signal pattern 711 may be repeatedly transmitted from the output driver 707 to be detected by neighboring packaged devices.

Figure 8:
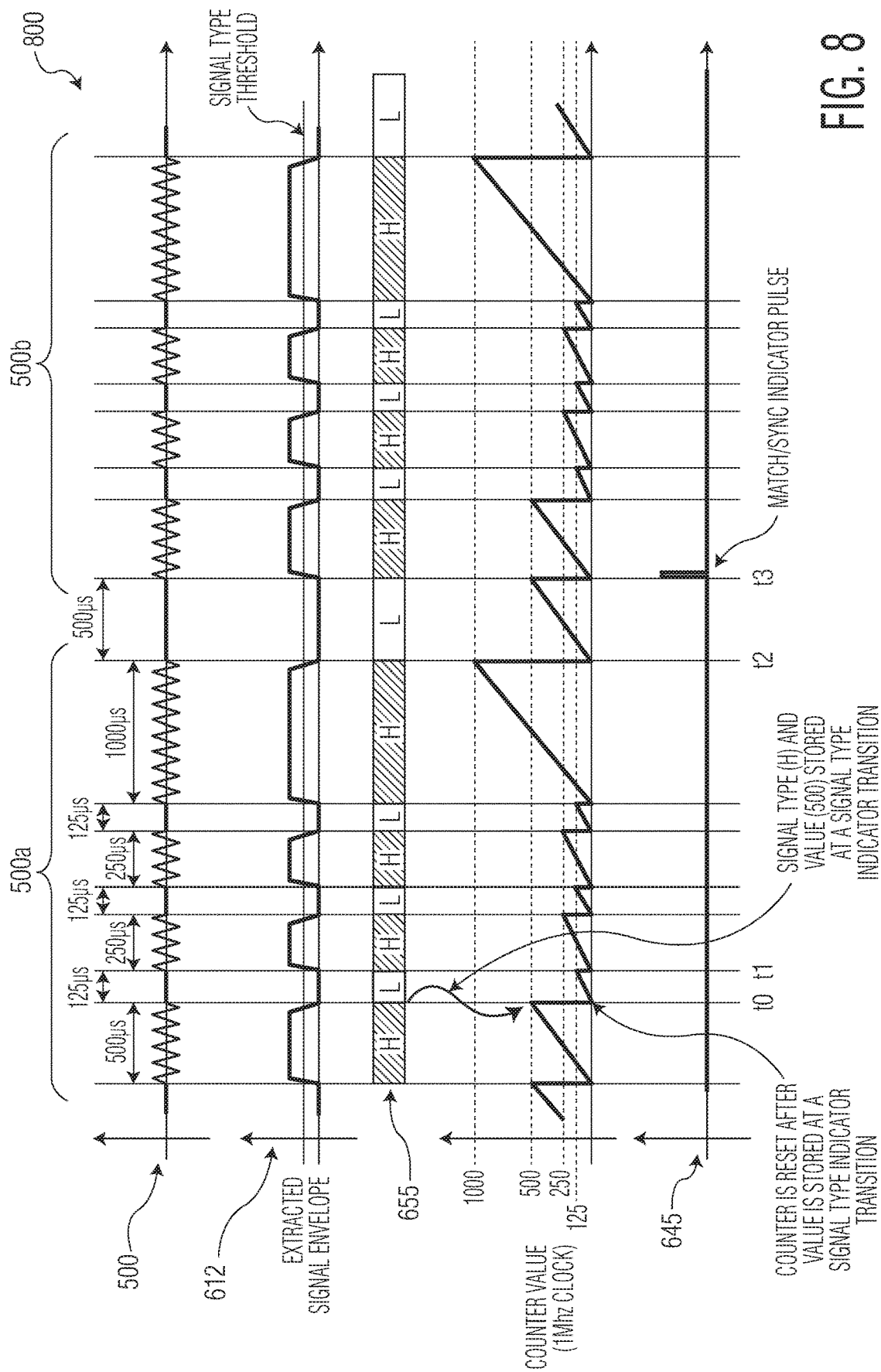
FIG. 8 illustrates signal pattern detection and synchronization operations in accordance with example embodiments described herein.

FIG. 8 illustrates signal pattern detection and synchronization operations 800 in accordance with example embodiments described herein. The example wake-up pattern 500 of FIG. 5 includes four HIGH periods alternating with four LOW periods. The sequences 500a and 500b as illustrated in FIG. 8 is represented as 500 us HIGH, 125 us LOW, 250 us HIGH, 125 us LOW, 250 us HIGH, 125 us LOW, 1000 us HIGH followed by a final 500 us LOW. At time t0, the signal type indicator wake up pattern 612 changes from HIGH to LOW, a HIGH signal type and counter value of 500 are recorded in the data storage module 680. The counter 630 is reset to 0 just after its value has been recorded. Generally, when the input signal transitions from HIGH to LOW or LOW to HIGH, the signal type indicator wake-up pattern 612 changes, and the counter value is saved, and then the counter is reset to zero. These counts describe the length of the HIGH and LOW portions of the signal and hence describe the pattern of the signal. Later, the measured counts can be compared to a prestored pattern for to see if the counts match.

Figure 9:
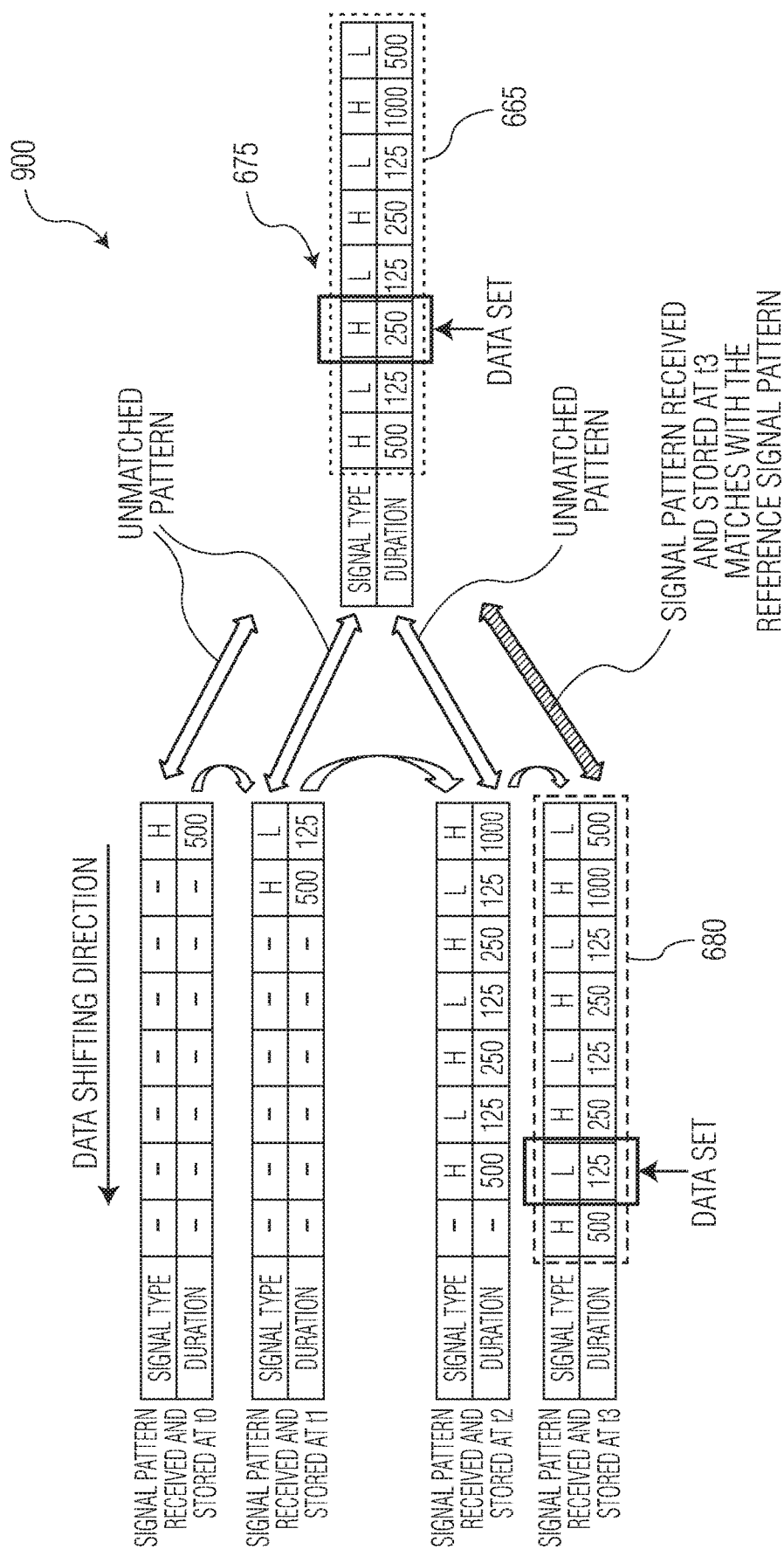
FIG. 9 illustrates signal pattern recording and comparison with the reference wake-up signal pattern in accordance with example embodiments described herein.

FIG. 9 illustrates signal pattern recording and comparison with the reference wake-up signal pattern 900 in accordance with example embodiments described herein. FIG. 9 illustrates the content of the data storage module 680 at different time points (t0, t1, t2 and t3) reflecting the capture of the received signal pattern (type and duration of each signal period) at these time points. At time t0, a signal pattern received and stored may only be represented by a High signal for 500 us, representing an unmatched pattern as compared with the reference wake-up signal pattern 675. At time t1, a signal pattern received and stored may be represented by H, L for respective durations of 500 us and 125 us, representing an unmatched pattern as compared with the reference wake-up signal pattern 675. At time t2, a signal pattern received and stored may be represented by H, L, H, L, H, L, H for respective durations of 500 us, 125 us, 250 us, 125 us, 250 us, 125 us, and 1000 us, representing an unmatched pattern as compared with the reference wake-up signal pattern 675. At time t4, a signal pattern received and stored may be represented by H, L, H, L, H, L, H, L for respective durations of 500 us, 125 us, 250 us, 125 us, 250 us, 125 us, 1000 us, and 500 us, representing a matched pattern as compared with the reference wake-up signal pattern 675.

Figure 10:
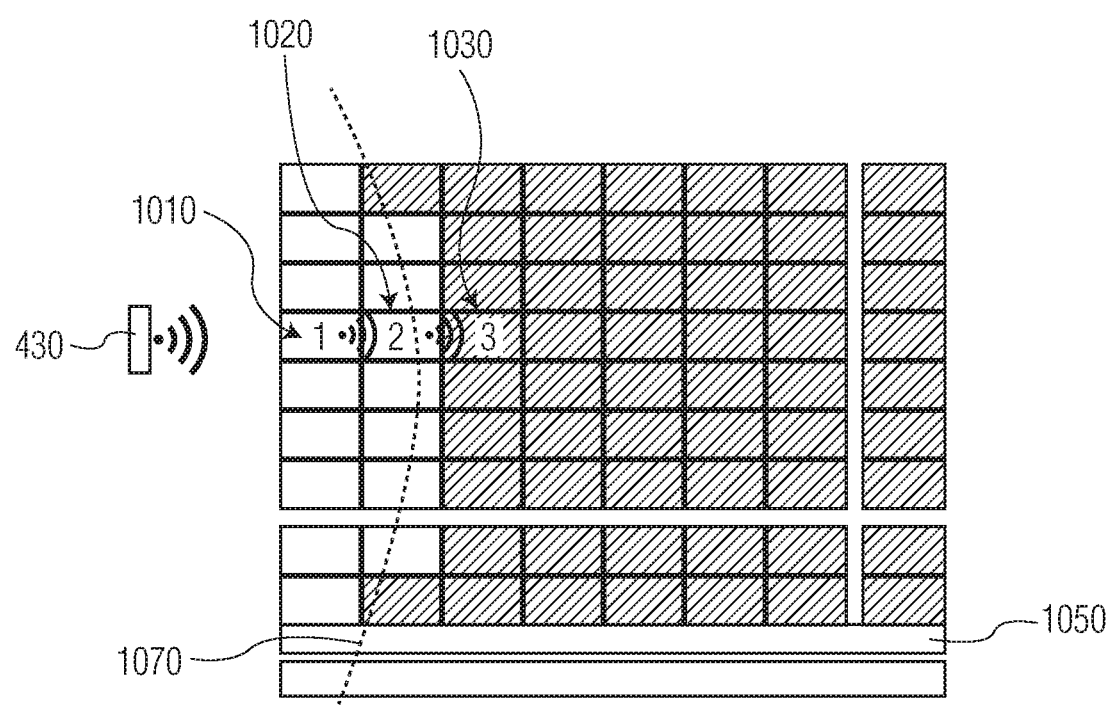
FIG. 10 illustrates signal strength with packaged devices acting as relays and wireless reader station in accordance with example embodiments described herein.

FIG. 10 illustrates signal strength with packaged devices acting as relays and wireless reader station 430 in accordance with example embodiments described herein. A first packaged device 1010 and a second packaged device 1020 may be within the reach of an NFC reader station 430. The magnetic field strength limit of the wireless reader 430 may be represented by dotted line 1070. The signal from the NFC wireless reader 430 may be too weak to reach a third packaged device 1030. The first packaged device 1010 and second packaged device 1020 may act as wake-up relays. The wake-up pattern from the wireless reader station 430 may be repeated by the first packaged device 1010 and by the second packaged device 1020. A sum of the three wake-up signals may be transmitted to the third packaged device 1030 and the summed wake-up signal may be used to wake-up the third packaged device 1030 and other devices having a same or similar distance proximity to the third packaged device 1030. Example embodiments provide signal synchronization of the three wake-up signals, and subsequent generated wake-up signals from other packaged devices to allow superimposition of received and transmitted signals from a packaged device. This daisy chain effect may continue throughout the pile of packaged devices. As farther wake-up signals wane in strength, closer packaged devices act as relays to sum their signals to high enough levels to wake further devices. In this manner, the initial wake-up pattern emitted by the wireless reader 430 may remain low, yet all the packed devices on the pallet 1050 may be awoken and pre-programmed with additional data. Because wake-up patterns may be sent in close proximity from packaged device to the packaged device, interference and other noise is kept at a minimum ensuring efficient wake-up of all packaged devices.

Figure 11:
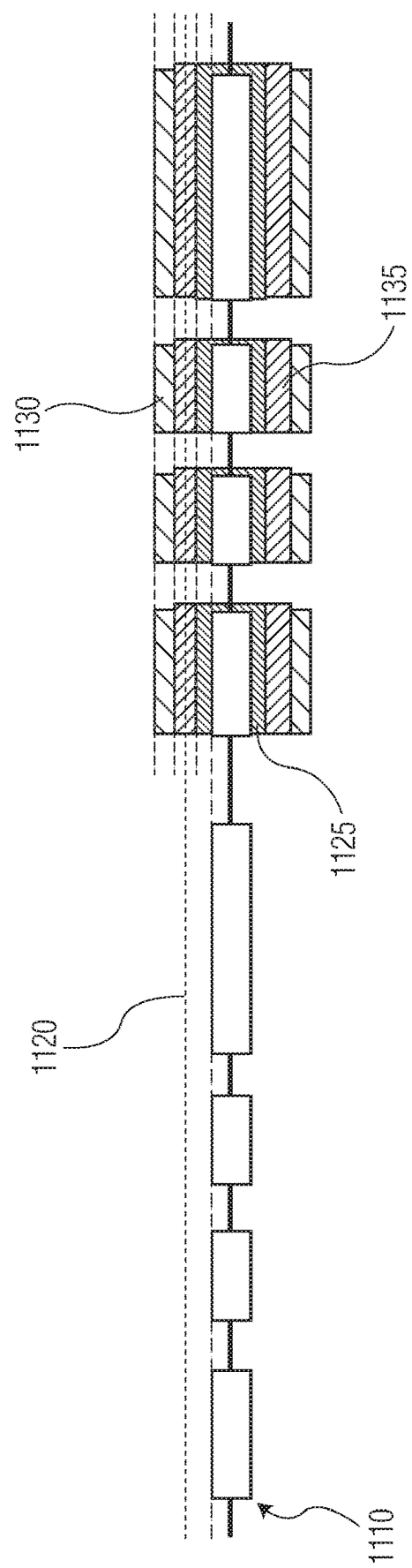
FIG. 11 illustrates combined signal strength at a third packaged device location in accordance with example embodiments described herein.

FIG. 11 illustrates combined signal strength wake up signal 1130 at a third packaged device location in accordance with example embodiments described herein. As illustrated in FIG. 11, a third packaged device (such as third packaged device 1030 in FIG. 10) that is outside the wake-up range of an NFC wireless reader (such as wireless reader 430) may receive a wake-up signal 1110 with a faint signal strength, not powerful enough to wake the third packaged device 1030. An acceptable signal strength level for the third packaged device 1030 is denoted by the line 1120, sufficient to wake-up the third packaged device. As discussed regarding FIG. 10, a combined wake up signal 1130 may be the sum of the weak wake-up signal 1110, a relay wake-up signal 1125 from a first packaged device, and a second relay wake-up signal 1135 from a second packaged device. The combined wake-up signal 1130 thus has an amplitude that is higher than the acceptable signal strength level 1120. The acceptable signal strength level 1120 may be a threshold turn on level for of the packaged devices within a pile. The combined wake-up signal 1130 will have a same wake-up message as a received signal. Example embodiments transmit a same wake-up message pattern as received from an external packaged device or wireless reader and in sync (superimposition) with the received wake-up message pattern.

As illustrated in FIG. 11, although a third packaged device in a relay chain may be out of reach of the NFC reader station, the third packaged device may receive the strong combined wake-up signal 1130 as a result of the signals transmitted by a first package device and a second packaged device acting as relays of the external wireless reader station. Without the synchronization step, the combination of the signals from the wireless NFC reader station and packaged devices would result in a signal pattern deviating from the desired wake-up signal pattern and would prevent the packaged device(s) of a pallet far away from the NFC reader station to wake-up. Packaged devices may therefore act as relays to propagate the wake-up signal pattern to its neighboring packaged devices that are typically out of reach of the NFC reader station. Each packaged device, once woken up, operates in the way described herein achieving a relay chain to reach and wake-up each device of the pallet. It is noted that the transmit power of one device may be greater than the threshold value, so that it can wakeup adjacent devices by itself, or it may be less than the threshold value, but because the combination of two or more transmissions from nearby packaged devices will provide enough power to exceed the threshold all of the packaged devices will be able to be woken up.

Once a packaged device is woken up, another two-way communication channel (e.g. WiFi, BT, 3G, 4G . . . ) can be subsequently activated to perform the device pre-personalization or other specific operation it has been woken up for. After completing the pre-personalization or any other operation it has been woken up for, the relay feature may be permanently disabled.

Because of the relay or chain reaction effect, a stop condition may also be used. In one example embodiment, each device will stop transmitting the pre-loaded reference wake-up signal pattern after a predetermined number of occurrences. In another example embodiment, the device will stop transmitting the preloaded reference wake-up signal pattern after having successfully performed the pre-personalization or any specific operation it has been woken up for. In another example embodiment, the device will stop transmitting the preloaded reference wake-up signal pattern after having successfully performed the pre-personalization or any specific operation it has been woken up for and completed the transmission of a predetermined number of occurrences of the pre-loaded reference wake-up signal pattern.

Thus, according to example embodiments, a device wakes up from a deep-sleep mode or power off mode when receiving energy from an external magnetic field. The device activates wireless transmission of a predetermined signal pattern in response to the detection of the same predetermined signal pattern conveyed by the external magnetic field.

The signal pattern transmitted by the device substantially overlaps in time with the received signal pattern such that the combination of both signals yields a same signal pattern but with a higher amplitude than the received signal. This combination of received and transmitted signal patterns is repeated as each wake-up device transmits the same signal pattern to additional inner devices.

The plurality of inner devices that receive the same signal pattern form a relay chain to wirelessly wake-up one or a plurality of neighboring devices that are out of reach of the external reader station.

Example embodiments include an ability of inner devices to stop transmitting the same signal pattern and go back to the deep-sleep mode after having transmitted successively a predefined number of occurrences of the same signal pattern and/or after having completed a task it had been woken up for.

Although the various example embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A wireless repeater system, comprising:
an antenna configured to receive a magnetic wake-up signal;
a near field communication (NFC) receiver configured to: extract a wake-up signal pattern from the received magnetic wake-up signal and compare the extracted wake-up signal pattern with at least one stored wake-up signal pattern; and
an NFC transmitter configured to: in response to a match between the extracted wake-up signal pattern and the stored wake-up signal pattern, transmit an output magnetic signal using the stored wake-up signal pattern, wherein transmission of the output magnetic signal is synchronized with the received magnetic wake-up signal to form a superimposed magnetic signal.

2. The wireless repeater system of claim 1, wherein the antenna, the NFC receiver, and the NFC transmitter are included in a first device, the output magnetic signal is synchronized with the received magnetic wake-up signal and with another output magnetic signal transmitted by an adjacent device.

3. The wireless repeater system of claim 1, wherein the NFC receiver is in a power-off state before receiving the magnetic wake-up signal.

4. The wireless repeater system of claim 1, wherein the output magnetic signal has a higher amplitude than a threshold value.

5. The wireless repeater system of claim 1, wherein the output magnetic signal is transmitted via the antenna.

6. The wireless repeater system of claim 1, comprising an envelope detector that is configured to compare the received magnetic wake-up signal with a threshold voltage to determine HIGH periods and LOW periods of the received magnetic wake-up signal and output a HIGH or LOW signal type indicator reflective of the HIGH and LOW periods, wherein a set of signal type indicators corresponds to the extracted wake-up signal pattern.

7. The wireless repeater system of claim 6, wherein the NFC receiver comprises:
a counter configured to measure a duration of each of the HIGH and LOW periods of the received magnetic wake-up signal;

a data storage module configured to store the durations and the signal type indicators as a predetermined number of data sets corresponding to the extracted wake-up signal pattern; and a pattern detector configured to compare the predetermined number of data sets of the extracted wake-up signal pattern to a predetermined number of data sets of the stored wake-up signal pattern.

8. The wireless repeater system of claim 7, wherein each data set includes a signal type indicator and a duration of a detected signal period.

9. The wireless repeater system of claim 1, wherein the extracted wake up signal is compared with a plurality of stored wake-up signal patterns to detect a match.

10. The wireless repeater system of claim 1, wherein after transmission of the superimposed signal, a transmitting device may remain in a receiver off state for a predetermined amount of time to avoid retriggering receipt of another wake-up signal.

11. A method, comprising:
receiving a magnetic wake-up signal;
extracting a wake-up signal pattern from the received magnetic wake-up signal and comparing the extracted wake-up signal pattern with a stored wake-up signal pattern; and
in response to a match between the extracted wake-up signal pattern and the stored wake-up signal pattern, transmitting an output magnetic signal using the stored wake-up signal pattern, wherein transmission of the output magnetic signal is synchronized with the received magnetic wake-up signal to form a superimposed magnetic signal.

12. The method of claim 11, wherein the output magnetic signal is synchronized with the received magnetic wake-up signal and with another output magnetic signal transmitted by an adjacent device.

13. The method of claim 11, wherein the NFC receiver is in a power-off state before receiving the magnetic wake-up signal.

14. The method of claim 11, wherein the output magnetic signal has a higher amplitude than a threshold value.

15. The method of claim 11, wherein the output magnetic signal is transmitted via the antenna.

16. The method of claim 11, comprising comparing the received magnetic wake-up signal with a threshold voltage to determine HIGH periods and LOW periods of the received magnetic wake-up signal and output a HIGH or LOW signal type indicator reflective of the HIGH and LOW periods, wherein a set of signal type indicators corresponds to the extracted wake-up signal pattern.

17. The method of claim 11, comprising measuring a duration of each of the HIGH and LOW periods of the received magnetic wake-up signal;
storing the durations and the signal type indicators as a predetermined number of data sets corresponding to the extracted wake-up signal pattern; and
comparing the predetermined number of data sets of the extracted wake-up signal pattern to a predetermined number of data sets of the stored wake-up signal pattern.

18. The method of claim 11, wherein each data set includes a signal type indicator and a duration of a detected signal period.

19. The method of claim 11, comprising comparing the extracted wake up signal with a plurality of stored wake-up signal patterns to detect a match.

20. The method of claim 11, wherein after transmission of the superimposed signal, keeping a transmitting device in a receiver off state for a predetermined amount of time to avoid retriggering receipt of another wake-up signal.

* * * * *